(12) United States Patent
Fujinaga et al.

(10) Patent No.: US 7,811,717 B2
(45) Date of Patent: Oct. 12, 2010

(54) ELECTRICALLY CONDUCTIVE MEMBER FOR SOLID OXIDE FUEL-STACK

(75) Inventors: Kosaku Fujinaga, Fukuoka-Ken (JP); Takeshi Saito, Fukuoka-Ken (JP); Toshiya Abe, Fukuoka-Ken (JP); Motoyasu Miyao, Fukuoka-Ken (JP)

(73) Assignee: Toto Ltd., Fukuoka-ken (JP)

(*) Notice: Subject to any disclaimer, the term of this patent is extended or adjusted under 35 U.S.C. 154(b) by 586 days.

(21) Appl. No.: 10/574,806

(22) PCT Filed: Oct. 27, 2004

(86) PCT No.: PCT/JP2004/015918

§ 371 (c)(1),
(2), (4) Date: Apr. 5, 2006

(87) PCT Pub. No.: WO2006/046287

PCT Pub. Date: May 4, 2006

(65) Prior Publication Data

US 2008/0254334 A1    Oct. 16, 2008

(51) Int. Cl.
   *H01M 8/02*   (2006.01)
(52) U.S. Cl. .................. 429/468; 429/466; 429/467
(58) Field of Classification Search .............. 429/30, 429/33, 34, 466, 467, 468
See application file for complete search history.

(56) References Cited

U.S. PATENT DOCUMENTS

| 4,833,045 A | 5/1989 | Pollack et al. |
| 4,898,792 A | 2/1990 | Singh et al. |
| 2003/0054215 A1 | 3/2003 | Doshi et al. |
| 2004/0234830 A1 * | 11/2004 | Draper et al. ............ 429/30 |

FOREIGN PATENT DOCUMENTS

| EP | 1294035 | 3/2003 |
| GB | 2286482 | 8/1995 |
| JP | 01-173577 | 7/1989 |
| JP | 11-025999 | 1/1999 |
| JP | 11025999 A * | 1/1999 |
| JP | 2003-282101 | 10/2003 |
| JP | 2004-349262 | 12/2004 |

* cited by examiner

*Primary Examiner*—Dah-Wei D Yuan
*Assistant Examiner*—Zachary Best
(74) *Attorney, Agent, or Firm*—Carrier, Blackman & Associates, P.C.; Joseph P. Carrier; William D. Blackman (57) ABSTRACT

Disclosed is an electrically conductive member for electrically connecting a plurality of solid oxide fuel cells in series and/or parallel to assemble a fuel-cell stack. The electrically conductive member according to the present invention comprises a metal sheet having a three-dimensional porous structure of a continuous skeleton. The electrically conductive member according to the present invention is three-dimensionally strong and is highly elastic and resilient. Therefore, the thickness of the electrically conductive member can be easily re-regulated in the regulation of spacing between the fuel cells. Further, even after baking or power generation, the electrically conductive member is not sintered, and separation easily takes place in the folded interface, and, thus, excellent maintainability can be realized.

18 Claims, 6 Drawing Sheets

ELECTRICALLY CONDUCTIVE MEMBER FOR SOLID OXIDE FUEL-STACK

BACKGROUND OF THE INVENTION

1. Field of the Invention

The present invention relates to an electrically conductive member for use in electrically connecting a plurality of solid oxide fuel cells to assemble a fuel-cell stack, and a fuel-cell stack using the same.

2. Background Art

Solid oxide fuel cells are expected as fuel cells that are operated at elevated temperatures (800 to 1000° C.) with high efficiency. The solid oxide fuel cells are usually used in the form of a structure called a stack comprising a plurality of solid oxide fuel cells (one fuel cell unit being hereinafter often referred to as "fuel cell") which have been electrically connected in series and/or parallel and bundled.

In forming the stack structure, a plurality of fuel cells should be electrically connected, and, to this end, a felt of nickel has been used as an electrically conductive member. For example, Japanese Patent Laid-Open No. 25999/1999 proposes a fuel-cell stack using an electrically conductive member formed by folding a metallic fiber assembly composed mainly of nickel, that is, an electrically conductive sheet formed of a nickel felt, a plurality of times. According to this publication, the claimed advantage of the electrically conductive member having this construction is to have cushioning properties satisfactory for stress relaxation between fuel cells.

So far as the present inventors know, however, there is still room for improvement in cushioning properties of the felt structure. The nickel felt is highly elastic. Since, however, it is formed of a plurality of fibers which have been entwined with each other, once compressive force is applied, the elasticity or restoring force becomes often unsatisfactory. As a result, after the felt structure is once placed between fuel cells and is pressed to a given shape, it is difficult to re-regulate the thickness in the regulation of the spacing between fuel cells. This is because, in the re-regulation of the spacing between the fuel cells, waste fibers disadvantageously occur, leading to a fear of causing energization across the electrodes. Further, after baking or power generation is once carried out, fibers in the nickel felt become complicatedly entwined with each other. In addition, the contact area between the fibers is so large that the fibers are disadvantageously integrally sintered in a hard state, making it difficult to replace a part of the fibers after that. As a result, the maintainability and the like are poor, and, thus, there is room for improvement.

SUMMARY OF THE INVENTION

The present inventors have now found that the use of a metal sheet having a three-dimensional porous structure of a continuous skeleton as an electrically conductive material of a fuel-cell stack can solve the above problems of the prior art and can constitute a good fuel-cell stack. The present invention has been made based on such finding.

Accordingly, an object of the present invention is to provide an electrically conductive member for a solid oxide fuel-cell stack that can construct a good fuel-cell stack.

Another object of the present invention is to provide a solid oxide fuel-cell stack using the electrically conductive member.

The electrically conductive member according to the present invention is an electrically conductive member for electrically connecting a plurality of solid oxide fuel cells in series and/or parallel to assemble a fuel-cell stack, characterized in that the electrically conductive member comprises a metal sheet having a three-dimensional porous structure of a continuous skeleton.

Further, according to the present invention, there is provided a fuel-cell stack characterized by comprising a plurality of solid oxide fuel cells electrically connected in series and/or parallel through the electrically conductive member according to the present invention.

DETAILED DESCRIPTION OF THE INVENTION

Basic Structure of Fuel-cell Stack

The structure of the fuel-cell stack using the electrically conductive member according to the present invention will be described with reference to the accompanying drawings.

Figure 1:
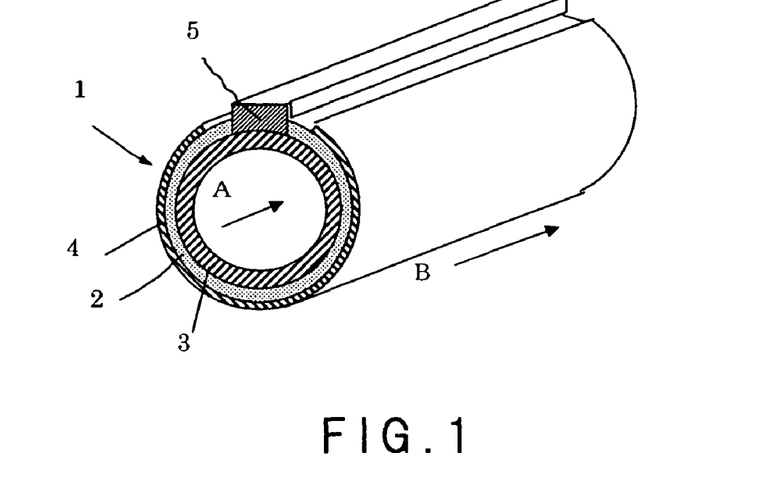
[FIG. 1] is a cross-sectional view showing an example of a fundamental structure of a cylindrical solid oxide fuel cell constituting a fuel-cell stack using the electrically conductive member according to the present invention. This fuel cell 1 comprises an electrolyte 2, an air electrode 3, a fuel electrode 4, and an interconnector 5 connected to the air electrode 3.

FIG. 1 is a cross-sectional view of a fundamental structure of a solid oxide fuel cell constituting a fuel-cell stack using the electrically conductive member according to the present invention. This fuel cell 1 comprises an electrolyte 2, an air electrode 3, a fuel electrode 4, and an interconnector 5 connected to the air electrode 3. In the fuel cell having this construction, oxygen-containing air is allowed to flow in an interior A direction in the air electrode 3 in the drawing while fuel gas containing hydrogen, carbon monoxide or the like is allowed to flow in an exterior B direction of the fuel electrode 4. The air electrode and the fuel electrode in the fuel cell may have a reverse construction of the construction shown in FIG. 1.

Figure 2:
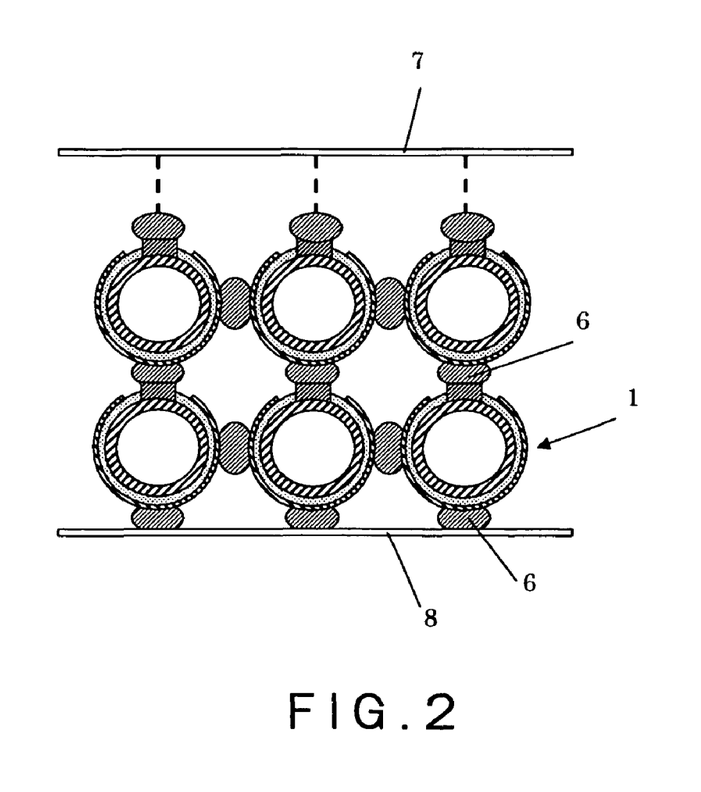
[FIG. 2] is a diagram showing one example of a fundamental structure of a fuel-cell stack using the electrically conductive member according to the present invention, wherein fuel cells 1 are electrically connected in series or parallel through an electrically conductive member 6 and electric power is output to a part between an air electrode-side electrode 7 and a fuel electrode-side electrode 8.

FIG. 2 is a diagram showing a fundamental structure of a fuel-cell stack using the electrically conductive member according to the present invention and comprises a plurality of cylindrical fuel cells 1 stacked on top of each other. As shown in FIG. 2, these fuel cells 1 are electrically connected in series and/or parallel through an electrically conductive member 6. Specifically, a fuel electrode 4 and an interconnector 5 are connected, and/or the fuel electrode 4 is connected to the fuel electrode 4. The generated power is output to a part between an air electrode-side electrode 7 and a fuel electrode-side electrode 8. Further, the electrically conductive member 6 is physically strongly linked to the fuel cell 1 on such an extent that the shape of the fuel-cell stack can be held. That is, the electrically conductive member 6 functions to electrically connect the fuel cells 1 and, at the same time, to physically link the electrically conductive members.

In the present invention, the metal sheet which will be described later is used as the electrically conductive member 6.

Electrically Conductive Member According to the Present Invention

Figure 3:
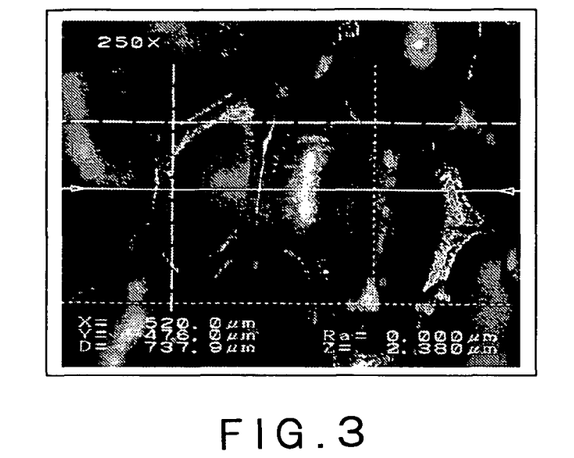
[FIG. 3] is an enlarged typical view of a three-dimensional porous structure of a continuous skeleton possessed by the electrically conductive member according to the present invention.

The electrically conductive member according to the present invention is a metal sheet having a three-dimensional porous structure of a continuous skeleton. FIG. 3 is an enlarged typical view of a metal sheet as the electrically conductive member according to the present invention. As shown in the drawing, the metal sheet according to the present invention has the so-called sponge-like structure and is characterized in that the three-dimensional porous structure of a continuous columnar skeleton or three-dimensional network structure has a continuous columnar skeleton. The three-dimensional porous structure of a continuous skeleton or three-dimensional network structure is greatly different from the felt having a porous structure or network structure formed by allowing a plurality of independent metal fibers, that is, noncontinuous metal fibers, to become complicatedly entwined with each other in this respect. This difference is a factor which provides advantageous properties and features of the electrically conductive member according to the present invention. Specifically, the conventional metal fiber felt formed of nickel or the like is formed of a plurality of complicatedly entwined noncontinuous fibers. Therefore, once compressive force is applied, the elasticity or restoring property becomes often unsatisfactory. By contrast, since the metal sheet according to the present invention has a three-dimensional structure of a continuous columnar skeleton, the metal sheet has three-dimensional strength and high elastic force and restoring force. As a result, the fuel cell can easily be produced. In particular, in the regulation of the spacing, advantageously, the thickness can easily be re-regulated. This will be described in more detail.

As will be described later, in use, the metal sheet according to the present invention is stacked, preferably folded and stacked. In this case, the interface of the stacked layers can be removed by a sword point-shaped file or the like even after compression. This is probably because, unlike the metal felt, the fibers do not become entwined with each other at the interface. Further, it should be noted that, in the metal felt, the contact area between the fibers is likely to be so large that, after baking or power generation, the fibers are integrated and sintered to a hard form. On the other hand, in the metal sheet according to the present invention, as compared with the metal fiber felt, the contact area between the fibers themselves or columns themselves is so small that the degree of sintering is low. As a result, as will be described later, the metal sheet is greatly advantageous in that, even after baking or power generation, separation easily takes place at the interface and, thus, maintainability is excellent.

Further, when the fuel cells are stacked on top of each other to form a stack, the whole assembly is compressed until the spacing between the fuel cells becomes close to a desired spacing to fit the electrically conductive member in the fuel cells. The fuel cells sometimes have a warpage of about 2 mm per m. Even when there are sites where the spacing between the fuel cells is not even due to the warpage, good connection can be ensured by the elasticity of the electrically conductive member. When the connection site between the fuel cell and the electrically conductive member is shifted or when a part of the electrically conductive member is inadvertently excessively pressed, however, in the case of the metal felt, a phenomenon was observed in which the restoring force is insufficient and reattempt to stack disadvantageously partially causes gaps. When the facts that the metal felt lacks in restoring force and there are sites where the spacing between the fuel cells is not even are taken into consideration, compression of the whole stack at a higher pressure is considered effective. Excessive pressure, however, leads to a fear of causing a breakage failure of the fuel cell. To overcome this problem, when the metal felt is utilized, after given pressing, spacing regulation has been carried out in such a manner that the felt has been added to the wider spacing part while cutting out the felt at the narrow part. This renders the production of the stack complicate and increases a workload. On the other hand, the metal sheet according to the present invention has better elasticity or restorability than the metal felt. Therefore, even a reattempt to stack the fuel cells can ensure good connection. Further, by virtue of the good elastic force and restoring force, the electrically conductive member can be fit into the fuel cells by a low pressure. Therefore, this can eliminate spacing adjustment required of the metal felt, or as will be described later, in constructing the electrically conductive member by folding, spacing adjustment can simply be carried out. Further, in the spacing adjustment, there is no fear of causing short-circuiting of the electrode due to the occurrence of waste fibers. Thus, the electrically conductive member according to the present invention has many advantages over the metal felt.

As shown in FIG. 1, when the electrically conductive member is placed in fuel gas, that is, a reducing atmosphere, the metal sheet constituting the electrically conductive member according to the present invention may be formed of nickel, or an alloy of nickel with at least one of chromium, platinum, rhodium, palladium, indium or ruthenium, preferably nickel or a nickel-containing alloy. In a case opposite to the case shown in FIG. 1, that is, in the case where the electrically conductive member is placed in an oxidizing atmosphere, the metal sheet may be formed of silver, or an alloy of silver with at least one of platinum, rhodium, palladium, indium, ruthenium, gold, silver, molybdenum, or tungsten.

In a preferred embodiment of the present invention, the diameter of voids possessed by the three-dimensional porous structure is in the range of 0.30 to 0.80 mm. More preferably, the lower limit of the void diameter is 0.35 mm, and the upper limit of the void diameter is 0.65 mm.

The axis diameter of the column as the skeleton of the three-dimensional porous structure is preferably 35 to 80 μm. More preferably, the lower limit of the axis diameter is 45 μm, and the upper limit of the axis diameter is 65 μm.

When the void diameter or the column axis diameter is in the above-defined range, the metal sheet has better three-dimensional strength and better elastic force and restoring force. In particular, holding without applying any local stress to fuel cells having a warpage of about 2 mm per m can be realized, and, consequently, a connection failure and damage to fuel cells can be effectively prevented. Further, when the void diameter is in the above-defined range, the three-dimensional porous structure can remain unchanged even after baking or power generation is once carried out.

In a preferred embodiment of the present invention, for the electrically conductive member according to the present invention, the air permeability (pressure loss) caused when wind has been applied at a speed of 3 m/sec to a material having a thickness of 10 mm is preferably about 40 to 60 mmAq, from the viewpoints of power generation of the fuel battery on its surface of connection to the electrically conductive member and contribution to temperature diffusion.

The thickness of the metal sheet as the electrically conductive member according to the present invention may be properly determined by taking into consideration, for example, the weight per unit area of the electrically conductive member and the elasticity of the metal sheet relative to the warpage of the fuel cells. The thickness of the metal sheet, however, is preferably in the range of about 0.3 to 1.5 mm, more preferably 0.5 to 1.0 mm.

The metal sheet as the electrically conductive member according to the present invention may be prepared by plating a resin, having a three-dimensional porous structure of a continuous skeleton, with a metal. For example, the metal sheet may be prepared by impregnating a polyurethane resin having a three-dimensional network structure of a continuous columnar skeleton with a cellulosic or acrylic pressure-sensitive adhesive coating material containing amorphous carbon particles, drying the assembly for conduction treatment, then plating the conduction-treated polyurethane resin with a metal by continuous electroplating, and conducting reduction treatment in a hydrogen gas stream at about 1000° C.

A commercially available metal sheet may also be used as the electrically conductive member according to the present invention. Specific examples of electrically conductive members formed of nickel include Celmet #7 and Celmet #8, available from Sumitomo Electric Industries, Ltd.

Production of Fuel Battery Stack

As described above, the electrically conductive member according to the present invention is used for electrically connecting a plurality of solid oxide fuel cells in series and/or parallel to form a fuel battery stack. The fuel-cell stack shown in FIG. 2 may be produced by placing the electrically conductive member according to the present invention between fuel cells 1 and fixing the electrically conductive member to the fuel cells 1. More specifically, the electrically conductive member according to the present invention is adhered, preferably through a nickel paste or a platinum paste, to a part between a fuel electrode 4 in the fuel cell 1 and an interconnector 5, and to a part between the fuel electrode 4 and the fuel electrode 4.

Figure 4:
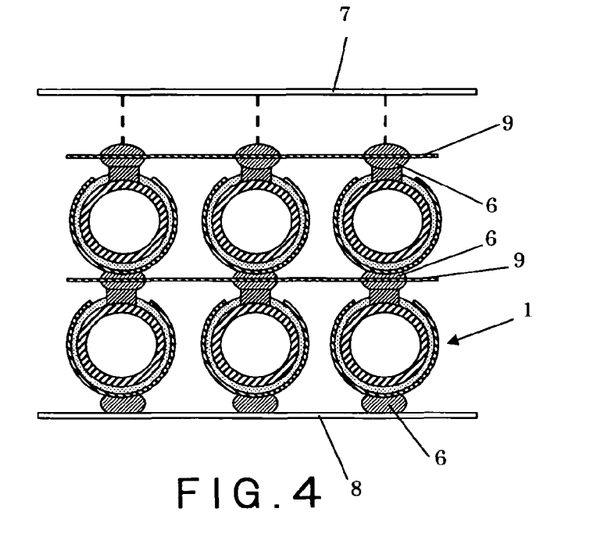
[FIG. 4] is a diagram showing one example of a fundamental structure of a fuel-cell stack using the electrically conductive member according to the present invention, wherein fuel cells 1 are electrically connected in series or parallel through an electrically conductive member 6 and a metal plate 9 and power is output to a part between an air electrode-side electrode 7 and a fuel electrode-side electrode 8.

In a preferred embodiment of the present invention, in assembling the fuel-cell stack, preferably, as shown in FIG. 4, a metal plate 9 is sandwiched between the fuel cell 1 and the electrically conductive member 6. The fuel-cell stack can be assembled stably with good accuracy by using the metal plate 9 as a reference. Further, this metal plate 9 can also advantageously function to rectify the fuel gas and allow the fuel gas to flow into the fuel-cell stack. Furthermore, the necessity of using the electrically conductive member for connecting the fuel cells in parallel can be eliminated. Therefore, the diffusion of the fuel gas on the electrode surface can be promoted, the fuel gas density can be averaged, and the surface temperature of the fuel cells can be equalized. Consequently, the power generation efficiency can advantageously improved. This metal plate 9 may be a metal plate or sheet, or alternatively may be the metal sheet according to the present invention. When the metal plate 9 is placed in a fuel gas, that is, in a reducing atmosphere, the metal plate 9 may be formed of nickel, or an alloy of nickel with at least one of chromium, platinum, rhodium, palladium, indium or ruthenium. When the metal plate 9 is placed in an oxidizing atmosphere, the metal plate 9 may be formed of silver, or an alloy of silver with at least one of platinum, rhodium, palladium, indium, ruthenium, gold, molybdenum, or tungsten. Preferably, this metal plate 9 has high density and low volume resistivity. Preferably, the thickness of the metal plate 9 is about 0.1 to 0.2 mm.

Figure 5:
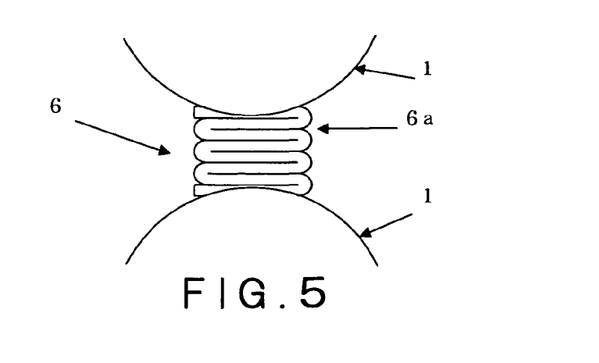
[FIG. 5] is an enlarged diagram of an assembly comprising the electrically conductive member according to the present invention which has been folded and stacked a plurality of times and placed between fuel cells.

In a preferred embodiment of the present invention, in placing the electrically conductive member between the fuel cells 1, the electrically conductive member may be formed of a plurality of metal sheets stacked on top of each other. In this case, however, in order to prevent the metal sheets from being separated from each other, preferably, a stack formed by folding and stacking one metal sheet a plurality of times is placed between the fuel cells 1. For example, as shown in FIG. 5, a stack formed by folding the metal sheet as the electrically conductive member a plurality of times is preferably placed between the fuel cells 1 from the viewpoint of relaxing the stress between the fuel cells (that is, cushioning properties). The thickness of the stack formed by stacking a plurality of metal sheets as the electrically conductive member on top of each other, or the thickness of the stack formed by folding one metal sheet as the electrically conductive member a plurality of times may be properly determined. In a preferred embodiment of the present invention, however, for example, when fuel cells having an outer diameter (cylindrical shape) of about 16.0 mm are electrically connected, the thickness of the electrically conductive member is about 1.0 mm to about 6.0 mm, more preferably about 2.0 to 5.0 mm. The weight per unit area of the metal sheet as the electrically conductive member according to the present invention is preferably in the range of about 0.08 to 1.20 g/cm$^3$, more preferably 0.45 to 1.00 $g/cm^3$. When the weight per unit area is in the above-defined range, low volume resistivity can be ensured and, at the same time, holding without applying any local stress to the fuel cells can be realized, whereby a connection failure and damage to the fuel cells can be effectively prevented.

Figure 6:
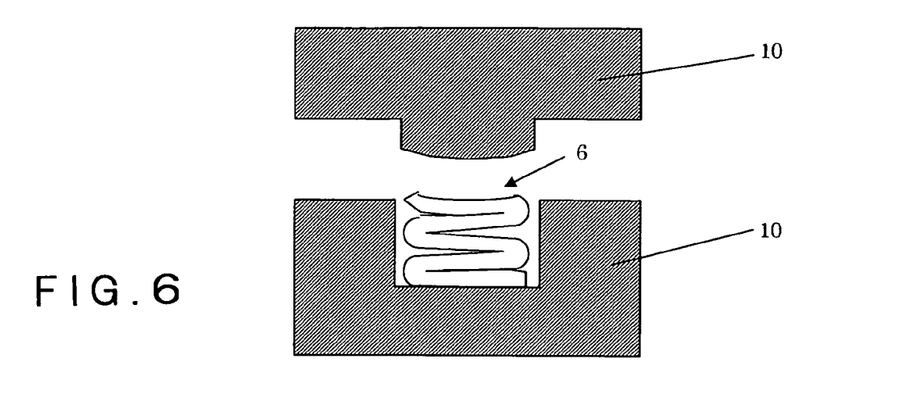
[FIG. 6] is a diagram illustrating the compression of the electrically conductive member according to the present invention by a press die.
Figure 7:
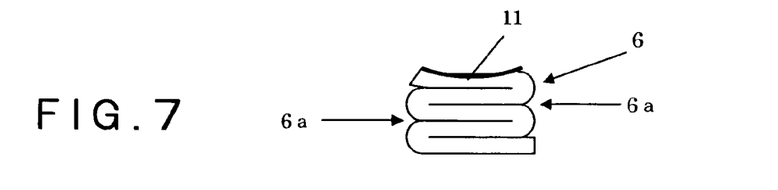
[FIG. 7] is a cross-sectional view of the electrically conductive member according to the present invention which has been folded and compressed.
Figure 8:
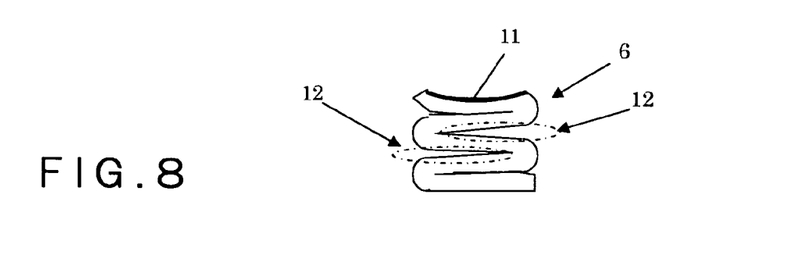
[FIG. 8] is a cross-sectional view of the electrically conductive member shown in FIG. 7 which has been widened at its interface of stacked layers.

The fuel cell is preferably produced while strictly controlling the dimension. Warpage or the like sometimes occurs due to its production process involving repetition of sintering and the like. Therefore, when a plurality of fuel cells are bundled together, the spacing between the fuel cells is not sometimes uniform. In order to prevent a local connection failure between the fuel cell and the electrically conductive member and to relax the stress, the thickness of the electrically conductive member and the weight per unit area should be re-regulated according to the nonuniform spacing. Even in this case, in the electrically conductive member according to the present invention, advantageously, the fuel cells can easily be connected without causing a contact failure and the like by folding and stacking the metal sheet, then compressing the stacked sheet to regulate the thickness and weight per unit area of the metal sheet, partially widening the folded and stacked interface of the electrically conductive member by means of a sword point-shaped file or the like and placing the stacked sheet as a spring-like elastic electrically conductive member between adjacent cells. More specifically, the following procedure may be adopted. At the outset, the folded electrically conductive member is compressed by a press die 10 as shown in FIG. 6 to prepare an electrically conductive member 6 preferably having a recessed face 11 conformed to the curved face of the fuel cell as shown in FIG. 7. An electrically conductive member 6 having a space 12 as shown in FIG. 8 and possessing spring-like elasticity can be prepared by inserting a sword point-shaped file (not shown) into the interface 6a of the electrically conductive member created by folding and stacking the electrically conductive member shown in FIG. 7 to widen the interface into layers.

Figure 9:
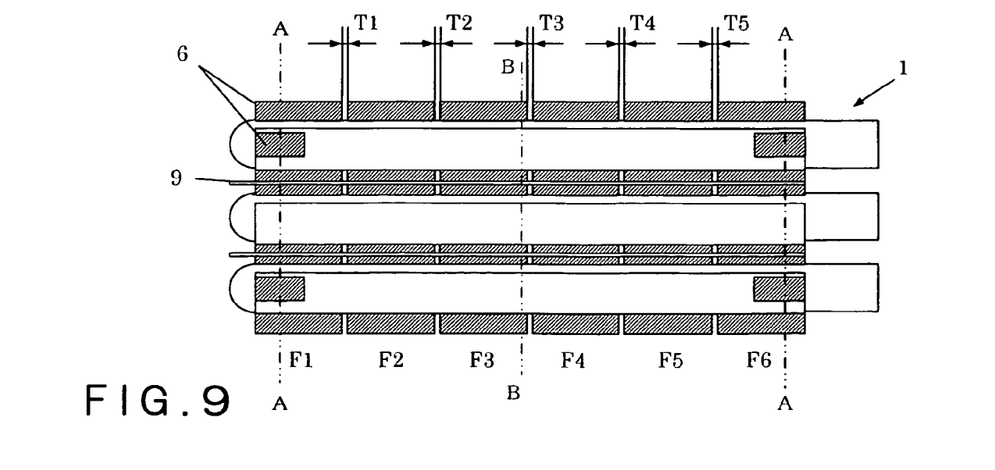
[FIG. 9] is a typical diagram showing a structure of a two parallel/three series fuel-cell stack using the electrically conductive member according to the present invention as viewed from the parallel side face.
Figure 10:
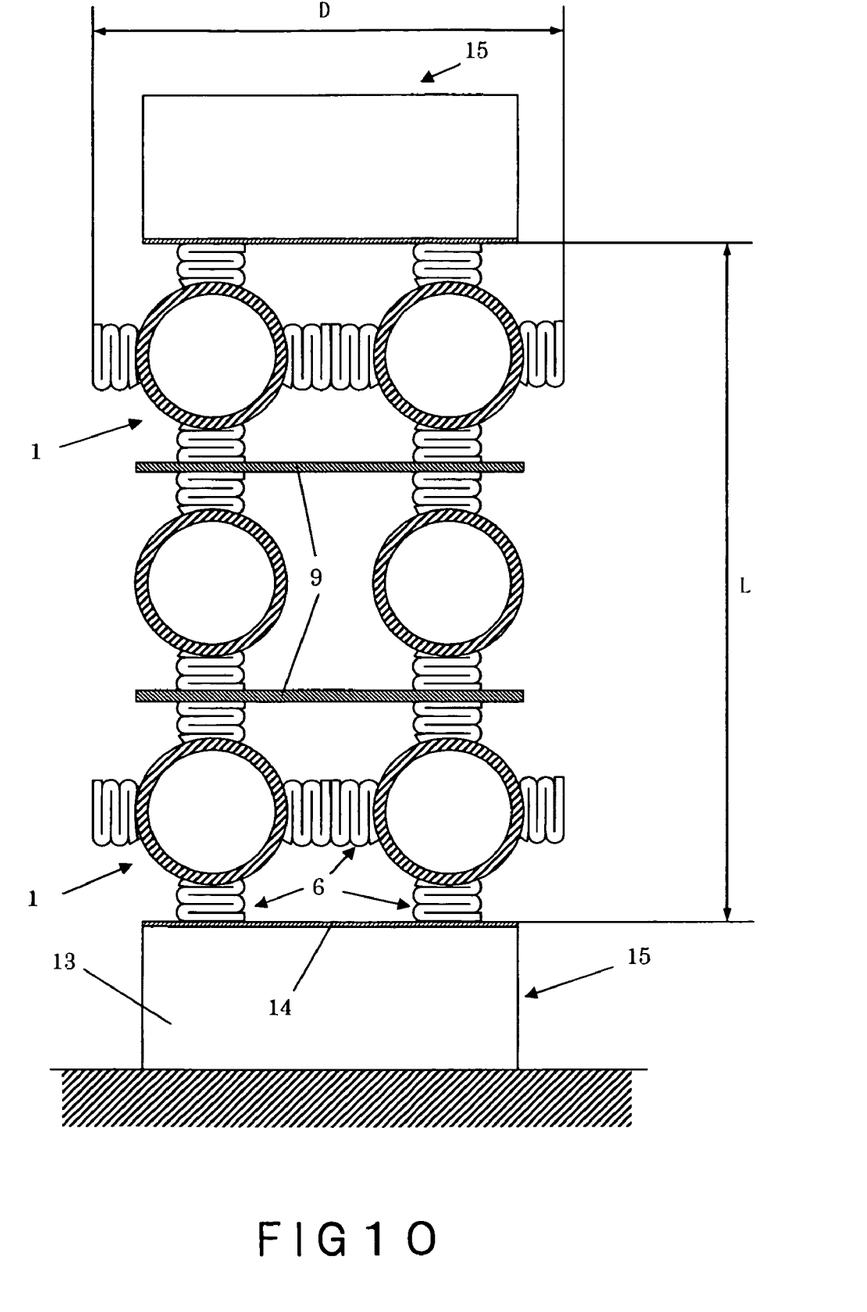
[FIG. 10] is a cross-sectional view taken on line A-A of the fuel-cell stack of FIG. 9, that is, a cross-sectional view of a fuel-cell stack prepared by stacking fuel cells to form a two parallel/three series fuel-cell stack using the electrically conductive member according to the present invention.
Figure 11:
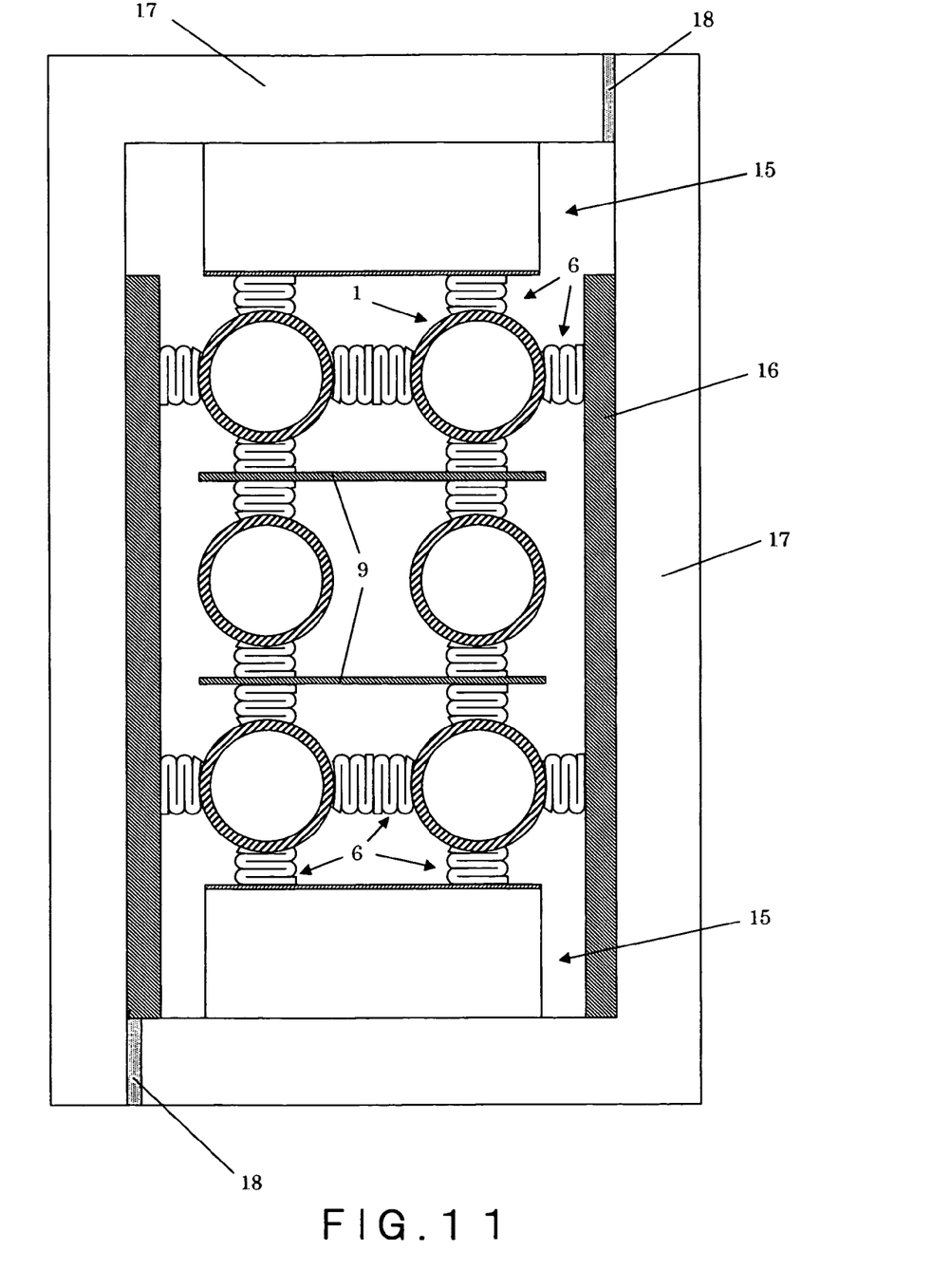
[FIG. 11] is a cross-sectional view taken on line A-A of the fuel-cell stack of FIG. 9, that is, a cross-sectional view of a fuel-cell stack prepared by stacking fuel cells to form a two parallel/three series fuel-cell stack using the electrically conductive member according to the present invention and then fixing the periphery of the fuel-cell stack by an insulating material.

Next, the electrically conductive member thus obtained is used to produce a fuel-cell stack. In a preferred embodiment of the present invention, the electrically conductive member may be mounted over substantially the whole length of the axial direction of one fuel cell, or alternatively may be divided into several parts and mounted with or without the provision of a gap between the divided parts. FIG. 9 is a typical diagram illustrating an embodiment in which the electrically conductive member in an electrically serial direction has been divided into several parts, which are mounted while providing a space between divided adjacent electrically conductive members, the electrically conductive member in an electrically parallel direction is mounted on only both ends of the fuel cells and is not mounted on the center part of the fuel cells in an electrically parallel direction. In the drawing, the electrically conductive member 6 in a serial direction is divided into six parts which are designated respectively as F1, F2, F3, F4, F5, and F6. The provision of the electrically conductive member in a divided form is advantageous in that, unlike the electrically conductive member which has been integrally constructed over substantially the whole length in the axial direction of one fuel cell, regulation depending, for example, upon spacing conditions and the like in the divided electrically conductive member provided parts can easily be carried out and, thus, the production of the fuel-cell stack can be facilitated. Other advantages of the provision of the electrically conductive member in a divided form include that the regulation of the gap between adjacent divided electrically conductive member parts or the omission of the provision of several divided electrically conductive member parts can improve the power generation efficiency. This will be described later in more detail. Further, it should be noted that, since the electrically conductive member according to the present invention has favorable elastic force and restoring force, even when the electrically conductive member is mounted on only both ends of the fuel cell and is not provided on the center part of the fuel cell, good connection and physical strength can be ensured. The production of the fuel-cell stack in this embodiment is specifically carried out as follows. At the outset, in order to realize mechanical stacking while preventing misregistration of the electrically conductive member, preferably, a pressure-sensitive adhesive is coated onto the electrically conductive member in its surface to be connected to the fuel cell, and, thereafter, each electrically conductive member 6 is mounted on the fuel cell 1. Subsequently, as shown in FIG. 10, electrically conductive members 6, fuel cells 1, electrically conductive members 6, and a metal plate 9 are stacked in that order on a stack fixation plate 15 comprising a heat resistant metal plate 13 provided with a ceramic plate 14 for insulating a fuel-cell stack-contact face. This stacking is repeated to stack the fuel cells of three stages, and a stack fixation plate 15 is then placed on the stack. Further, as shown in FIG. 11, an electrically conductive member 6 to be connected to a parallel-side electrode in the fuel-cell stack, and a parallel ceramic plate 16 are disposed. Thereafter, the periphery of the assembly is surrounded by a heat insulating material 17. The fuel-cell stack is compressed from above the heat insulating material 17 for dimension regulation. Thereafter, the heat insulating material is fixed with the aid of an adhesive.

In the present invention, by virtue of good elastic force and restoring force possessed by the electrically conductive member per se and, in addition, the elastic force and restoring force possessed even after folding of the electrically conductive member, good connection can be ensured even in the case where, when a plurality of fuel cells are bundled together, there are sites where the spacing between the flue cells is not uniform. On the other hand, when the metal felt is used in the electrically conductive member, the elastic force and the restoring force are unsatisfactory. Therefore, in sites where the spacing is disadvantageously increased and the amount of the felt is insufficient, a thin felt sheet should be separately provided and added, or in sites where the amount of the felt is excessive, the felt should be cut out so that excessive stress is not applied to the fuel cells. In assembling all the stages of the fuel cells as shown in FIG. 9, this operation should be carried out for each electrically conductive member in F1 to F6. Thus, the use of the felt as the electrically conductive member complicates the production process of the stack and increases the workload. Further, this operation disadvantageously sometimes causes metal fiber waste. The electrically conductive member according to the present invention is very advantageous in that the complexity of the production process can be significantly reduced and no metal fiber waste is produced.

After the fuel cells are assembled by stacking, the stack is baked for fixing the fuel cells and the electrically conductive member. Specifically, the fuel cells and the electrically conductive member are fixed by fusing of a nickel paste or a platinum paste upon heating to a temperature of about 800 to 1000 degrees. Thereafter, the fuel-cell stack is applied to power generation. On the other hand, in another embodiment of the present invention, a method may be adopted in which any baking step is not provided and, immediately after the assembly of the stack, the stack is applied to power generation to substantially carry out the baking step through the utilization of heating in an early stage of the power generation. Accordingly, the term "baking" or "baking step" as used herein refers to the baking step in which heating is carried out before power generation, as well as the case where an attempt to obtain the same results as the baking step is made by heating during power generation unless otherwise specified.

A great feature of the electrically conductive member according to the present invention is that, after this baking, that is, even after exposure to a high temperature of 800 to 1000 degrees, the electrically conductive member has such a layer structure that separation is possible from the interface of folded and stacked metal sheet. In the case of the nickel felt, a plurality of nickel fibers become complicatedly entwined with each other to increase the contact area among the fibers. Therefore, upon exposure to the above high temperatures, the fibers are sintered or fixed to disadvantageously produce a hard product, that is, a uniform metal layer. As a result, the layer structure attributed to the stacking is lost. In the electrically conductive member according to the present invention, however, since pores comprise continuous metal columns, the electrically conductive member according to the present invention has three-dimensional strength. Further, as compared with the felt of metal fibers, the contact area between the fibers or columns is so small that the contact area of the layer structure of the stacked metal sheet is also reduced. Therefore, it is considered that the layer structure is still maintained. As a result, for example, layers are easily separated from each other from the interface created by folding and stacking of the metal sheet indicated by 6a in FIG. 5 by inserting a sword point-shaped file or the like between the layers. By virtue of this, after baking or power generation, malfunction, for example, due to a failure of contact between a part of the fuel cells and the electrically conductive member can easily be repaired, and the replacement thereof is also easy. Further, the fuel cell can easily be replaced on a cell basis. The fuel-cell stack using the electrically conductive member according to the present invention is very advantageous in maintainability. Accordingly, in another embodiment of the present invention, there is provided a maintenance method for a fuel-cell stack. This maintenance method is a method for a fuel-cell stack comprising a plurality of solid oxide fuel cells electrically connected in series and/or parallel through an electrically conductive member, characterized in that the electrically conductive member is formed of the metal sheet according to the present invention, and the electrically conductive member and/or the fuel cell are replaced after baking or power generation.

Figure 12:
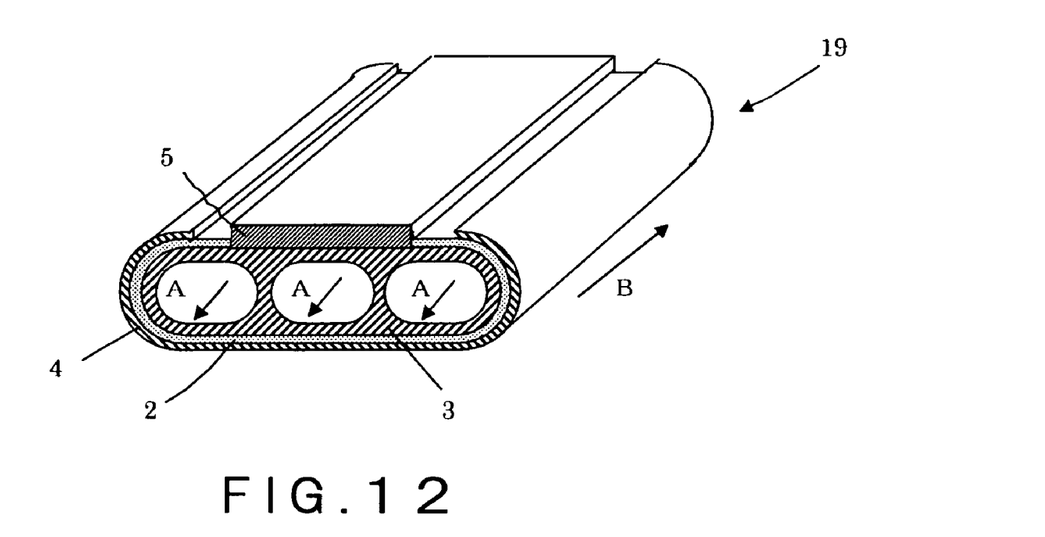
[FIG. 12] is a diagram showing a cylindrical solid oxide fuel cell constituting the fuel-cell stack using the electrically conductive member according to the present invention, wherein this fuel cell 19 comprises an electrolyte 2, an air electrode 3, a fuel electrode 4, and an interconnector 5 connected to the air electrode 3, two or more cylindrical spaces are provided in the air electrode 3, and oxygen-containing air is allowed to flow in an interior A direction while fuel gas is allowed to flow in a fuel electrode 4 side direction B.
Figure 13:
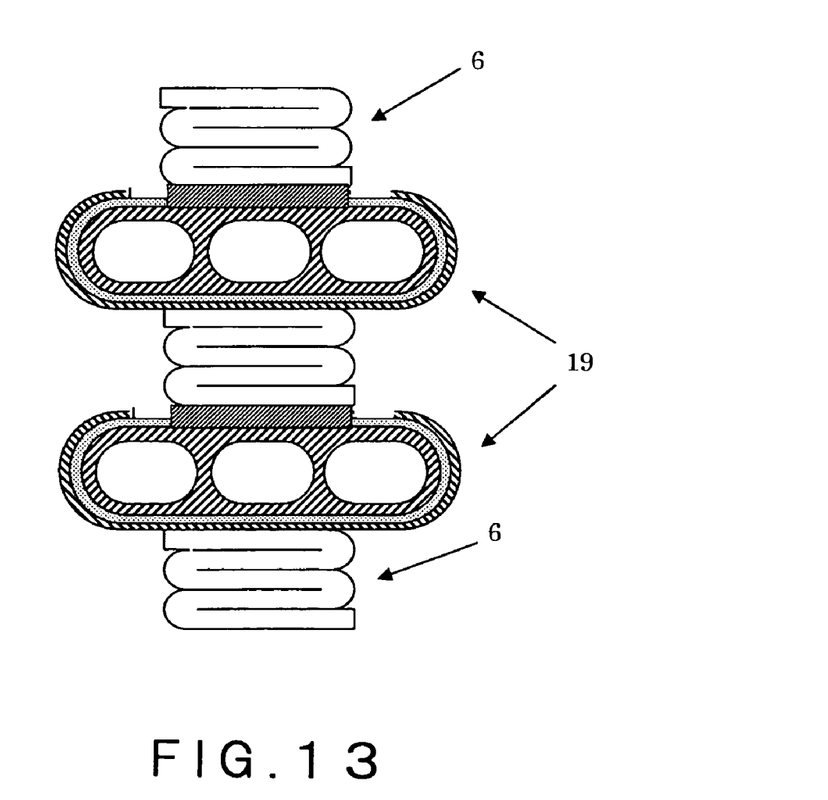
[FIG. 13] is a diagram of a fundamental structure of a fuel-cell stack prepared from the fuel cell 19 shown in FIG. 12 using the electrically conductive member 6 according to the present invention.

In a preferred embodiment of the present invention, the form of the fuel cells is basically cylindrical as described above. For example, a construction as shown in FIG. 12 may be adopted in which the fuel cell comprises an electrolyte 2, an air electrode 3, a fuel electrode 4, and an interconnector 5 connected to the air electrode 3, two or more cylindrical spaces are provided in the air electrode 3, and oxygen-containing air is allowed to flow in an interior A direction. In this drawing, a fuel gas containing, for example, hydrogen and carbon monoxide is allowed to flow in an exterior B direction of a fuel electrode 4. Even when the fuel cell having this construction is used, as shown in FIG. 13, a stack may be constructed using the electrically conductive member 6 according to the present invention.

As described above, in the present invention, the electrically conductive member may be divided into several parts which are then mounted on the fuel cell. The present invention includes an embodiment in which the spacing between the divided parts is regulated or an embodiment in which some of the divided electrically conductive member parts are not provided. This embodiment will be described.

At the outset, in one preferred embodiment, the spacing between the divided electrically conductive member parts is regulated on the fuel gas exhaust side, or alternatively some of the divided electrically conductive member parts are not provided. More specifically, for example, in the embodiment shown in FIG. 9, a construction may be adopted in which F1, F2, F3, and F6 are provided while F4 and/or F5 on the fuel gas exhaust side are not provided (preferably, F5 is not provided). Here, preferably, any spacing is not provided between adjacent parts of F1, F2, F3, and F4 (that is, in the drawing, T1=T2=T3=0). Alternatively, a construction may be adopted in which all of F1, F2, F3, F4, F5, and F6 are provided and any spacing is not provided between adjacent parts of F1, F2, and F3 on the fuel gas supply side (that is, in the drawing, T1=T2=0) while spacing is provided between adjacent parts of F4, F5, and F6 on the fuel gas exhaust side (that is, in the drawing, T3=T4=T5=T). Here the spacing between adjacent parts of F4, F5, and F6 (that is, T3, T4, and T5) may be the same or different. On the fuel gas exhaust side, regulation of the spacing between the divided electrically conductive member parts, or omission of the provision of some of the divided electrically conductive member parts is advantageous when the concentration and/or temperature of the supplied fuel gas are high. That is, on the fuel gas supply side, the concentration of the fuel gas which has been just supplied is high, and the temperature of the fuel cell is also high. As a result, power generation can be carried out with high efficiency. On the other hand, as a result of the highly efficient power generation on the fuel gas supply side, on the fuel gas exhaust side, the concentration of the fuel gas in the fuel-cell stack is lowered. Further, the combustion level of the waste fuel gas and the waste air discharged from the fuel cell is reduced, and the fuel battery undergoes this influence and consequently is likely to cause temperature lowering. As a result, there is a fear of causing a significant lowering in power generation efficiency on the fuel gas exhaust side. Further, the temperature difference in the axial direction of the fuel cell has a fear of causing, due to thermal stress, a contact failure between the fuel cell and the electrically conductive member or damage to the fuel cell. In the above embodiment of the present invention, however, the space of movement of the fuel gas is increased by an area corresponding to an area where the electrically conductive member has not been provided on the fuel gas exhaust side, and the flow rate of the fuel gas is lowered, resulting in increased area and time of contact between the fuel gas and the fuel cell. This is very advantageous in that the power generation efficiency and the temperature distribution can be rendered even in the axial direction of the fuel cell. Here the left side from substantially the center in the axial direction of the fuel cell indicated by line B-B of FIG. 9 is referred to as the fuel gas supply side, and the right side is referred to as the fuel gas exhaust side.

On the other hand, on the fuel gas supply side, in some cases, regulation of the spacing between adjacent divided electrically conductive member parts, or omission of the provision of some of the divided electrically conductive member parts is sometimes advantageous. Specifically, on the fuel gas supply side, heat involved in the takeout of current created in the serial direction is generated in connection between the fuel cell and the electrically conductive member, or heat involved in an electrode reaction is generated. On the fuel gas supply side, the space of movement of the fuel gas is increased by an area corresponding to an area where the electrically conductive member has not been provided, resulting in lowered flow rate of the fuel gas and increased area and time of contact between the fuel gas and the fuel cells. Further, on the fuel supply side, the concentration of hydrogen having excellent temperature conductivity is high. Therefore, the heat is diffused by the fuel gas, and excessive thermal storage can be effectively suppressed. This is very advantageous in that the power generation efficiency and temperature distribution in the axial direction of the fuel cell can be rendered even. On the fuel gas supply side, a specific construction in which the spacing between adjacent divided electrically conductive member parts is regulated, or some of the divided electrically conductive member parts are not provided may be opposite to the construction on the fuel gas exhaust side in which the spacing between adjacent divided electrically conductive member parts is regulated, or some of the divided electrically conductive member parts are not provided. Accordingly, for example, in the embodiment shown in FIG. 9, a construction may be adopted in which F2 and/or F3 on the fuel gas supply side is not provided (preferably, F2 is not provided), and F1, F4, F5, and F6 are provided. Here, preferably, any spacing is not provided between adjacent parts of F4, F5, and F6 (that is, in the drawing, T4=T5=0). Alternatively, a construction may be adopted in which all of F1, F2, F3, F4, F5, and F6 are provided and spacing is provided between adjacent parts of F1, F2, and F3 on the fuel gas supply side (that is, in the drawing, T1=T2=T) while any spacing is not provided between adjacent parts of F4, F5, and F6 on the fuel gas exhaust side (that is, in the drawing, T3=T4=T5=0). Here the spacing between adjacent parts of F1, F2, and F3 (that is, T1 and T2) may be the same or different.

Whether or not the regulation of the spacing between adjacent divided electrically conductive member parts or omission of the provision of some of the divided electrically conductive member parts on the fuel gas exhaust side is adopted, or whether or not the regulation of the spacing between adjacent divided electrically conductive member parts or omission of the provision of some of the divided electrically conductive member parts on the fuel gas supply side is adopted, may be determined by taking into consideration, for example, the composition and temperature of the fuel gas, the efficiency of the fuel cell, and the construction of the fuel-cell stack, and all of these embodiments fall within the scope of the present invention.

EXAMPLES

The present invention will be described in more detail with reference to the following Examples. However, it should be noted that the scope of the present invention is not limited to these Examples only.

Example 1

A fuel cell having a structure shown in FIGS. 9 to 12 was produced as follows. A fuel cell having an outer diameter of about 16.0 mm and a length of 660 mm and provided with a nickel metal film having a thickness of about $40\pm20$ μm on the electrically serial and parallel connecting faces was first provided. The target dimension of the fuel-cell stack was as shown in FIG. 10, that is, was such that the serial direction length L was 66.2 mm and the parallel direction length D was 45.5 mm. As the electrically conductive member, Celmet #8 (manufactured by Sumitomo Electric Industries, Ltd., thickness 0.8 mm, 0.55 g/cm$^3$) was folded and stacked (weight per unit area of electrically conductive member: about 0.50 to 1.00 g/cm$^3$) to constitute six layers in the case of the electrically conductive member in the parallel direction shown in FIG. 10, and was folded and stacked to constitute three layers in the case of the electrically conductive member formed inside in the serial direction. Next, in all the stages of the fuel cells as shown in FIG. 9, the individual electrically conductive members in the serial direction of F1 to F6 were compressed by means of a press die 10 as shown in FIG. 6 to prepare an electrically conductive member 6 having a recessed face 11 as shown in FIG. 7. The electrically conductive members in the parallel direction were also prepared in the same manner as described above. Thereafter, a sword point-shaped file was inserted into the interface 6a shown in FIG. 7 to widen the interface into layers, whereby an electrically conductive member 6 having spring-like elasticity provided with a space 12 as shown in FIG. 8 was prepared. In this case, the thickness of the elastic electrically conductive member widened into layers was made somewhat larger than, that is, was brought to about 106% to 111% of the thickness of the electrically conductive member after baking. Subsequently, in assembling the fuel-cell stack, for mechanical stacking while preventing misregistration of the electrically conductive member, an acrylic pressure-sensitive adhesive was coated on the connecting surface of the electrically conductive member 6 and the fuel cell, and the individual electrically conductive members 6 were mounted on the fuel cells 1.

Next, as shown in FIG. 10, the electrically conductive member 6, the fuel cell 1, the electrically conductive member 6, and the metal sheet 9 of nickel were stacked in that order on a stack fixation plate 15 formed of a heat resistant metal plate 13 of Inconel provided with a serial ceramic plate 14 of mullite on its surface with which the fuel-cell stack came into contact, followed by disposition of a stack fixation plate 15 thereon. Next, as shown in FIG. 11, the electrically conductive member 6 and the parallel ceramic plate 16 of mullite were disposed on the parallel-side electrode of the fuel-cell stack, and the periphery of the assembly was surrounded by a heat insulating material 17 (18HD, manufactured by NICHIAS Corporation). The fuel-cell stack was compressed from the top of the heat insulating material 17 for dimension regulation before baking. In this case, the thickness of the electrically conductive member was compressed to 104% to 105% of the thickness of the electrically conductive member after baking, and the remaining electrically conductive member thickness about 4 to 5% was left as being regulated by the difference in thermal expansion between the stack fixation plate and the heat insulating material at the time of baking. Next, the end of the heat insulating material 17 was fixed with the aid of an adhesive 18 (ARON CERAMIC D, manufactured by TOAGOSEI CO., LTD.).

Alumina-based ceramic fibers were disposed around the open end of the fuel-cell stack, and baking was carried out at about 900 to 950 degrees in such a state that the atmosphere on the outer side of the fuel cells was a reducing atmosphere of hydrogen and the atmosphere on the inner side of the fuel cells 1 was an oxidizing atmosphere of air. Thus, a contemplated fuel-cell stack was prepared.

Power generation was carried out by this fuel-cell stack using hydrogen at a fuel utilization rate of 75% and a current density of 0.20 A/cm$^2$. Thereafter, for two fuel cells connected to the metal plate 9, a sword point-shaped file was inserted into the interface of the stacked part of the electrically conductive member 6 to continuously widen the stacked face adhered in a layer form to open the center part of the layers, and one fuel cell 1 could be removed without influence on the other fuel cell 1.

Example 2 (Comparative Example)

The same fuel cells as in Example 1 were provided, and the fuel-cell stack having the same structure and size as in Example 1 was prepared in the same manner as in Example 1, except that nickel felt (manufactured by Bekaert Asia, fiber diameter 12 μm, thickness 1.0 mm, weight per unit area 0.9 g/cm$^3$) was used as the electrically conductive member. The weight of the felt per unit area was brought to about 0.50 to 1.50 g/cm$^3$.

In assembling the stack shown in FIG. 9, the nickel felt was shaved in the range of 0.2 to 0.5 mm to prepare a thin sheet. When the space between each fuel cell 1 and the electrically conductive member 6 is partially wide, this thin sheet was additionally provided. On the other hand, in sites where excessive stress is considered to be applied to the fuel cell due to narrow spacing between each fuel cell 1 and the electrically conductive member 6, the nickel felt was shaved for amount regulation. This procedure was carried out for the electrically conductive members of F1 to F6 in all the stages of the fuel cells as shown in FIG. 9.

Power generation was carried out by this fuel-cell stack using hydrogen at a fuel utilization rate of 75% and a current density of 0.20 A/cm$^2$. Thereafter, for two fuel cells connected to the metal plate 9, an attempt was made to insert a sword point-shaped file or a cutter into the interface of the stacked part of the electrically conductive member to continuously widen the stacked face adhered in a layer form and to open the center part of the layers. However, one fuel cell 1 could not be removed without influence on the other fuel cell 1 due to the separation of the inter connector part or integral separation of the electrically conductive member 6.

The invention claimed is:

1. A fuel-cell stack comprising a plurality of solid oxide fuel cells electrically connected in series and/or parallel through an electrically conductive member, wherein the electrically conductive member comprises a metal sheet having a three-dimensional porous structure of a continuous skeleton which has been folded a plurality of times or the electrically conductive member comprises a plurality of metal sheets having a three-dimensional porous structure of a continuous skeleton stacked on top of each other, wherein the axis diameter of the skeleton is in the range of 35 to 80 μm, and wherein the layered structure of the folded or stacked metal sheets undergo separation from the interface of the folded or stacked part of the metal sheet after baking or power generation.

2. The fuel-cell stack according to claim 1, wherein the electrically conductive member comprises the plurality of metal sheets having a three-dimensional porous structure of a continuous skeleton stacked on top of each other, and the thickness of the stacked metal sheets is about 1.0 mm to about 6.0 mm.

3. The fuel-cell stack according to claim 1, wherein the electrically conductive member comprises the metal sheet having a three-dimensional porous structure of a continuous skeleton which has been folded a plurality of times.

4. The fuel-cell stack according to claim 3, wherein the thickness of the folded metal sheet is about 1.0 mm to about 6.0 mm.

5. The fuel-cell stack according to claim 1, wherein each of the solid oxide fuel cells comprises at least an electrolyte, an air electrode, a fuel electrode, and an interconnector connected to the air electrode or fuel electrode and is cylindrical.

6. The fuel-cell stack according to claim 1, which has been subjected to baking or power generation.

7. The fuel-cell stack according to claim 1, wherein the electrically conductive member is provided over substantially the whole length of each of the fuel cells in an axial direction of the fuel cell.

8. The fuel-cell stack according to claim 7, wherein in an electrically serial direction the electrically conductive member is provided over substantially the whole length of each of the fuel cells in an axial direction of the fuel cell.

9. The fuel-cell stack according to claim 1, wherein the electrically conductive member is divided into a plurality parts which are provided over substantially the whole length of each of the fuel cells in an axial direction of the fuel cell.

10. The fuel-cell stack according to claim 9, wherein in an electrically serial direction the electrically conductive member has been divided into a plurality parts which are provided over substantially the whole length of each of the fuel cells in an axial direction of the fuel cell.

11. The fuel-cell stack according to claim 1, wherein the electrically conductive member is provided only on a part of each of the fuel cells.

12. The fuel-cell stack according to claim 11, wherein in an electrically serial direction the electrically conductive member is provided only on said part of each of the fuel cells.

13. The fuel-cell stack according to claim 1, wherein the electrically conductive member is provided only on both ends and a fuel gas feed-side of each of the fuel cells.

14. The fuel-cell stack according to claim 13, wherein in an electrically serial direction the electrically conductive member is provided only on said both ends and fuel gas feed-side of each of the fuel cells.

15. The fuel-cell stack according to claim 1, wherein the electrically conductive member is provided only on both ends and a fuel gas exhaust-side of each of the fuel cells.

16. The fuel-cell stack according to claim 15, wherein in an electrically serial direction the electrically conductive member is provided only on said both ends and fuel gas exhaust-side of each of the fuel cells.

17. The fuel-cell stack according to claim 1, wherein the electrically conductive member is provided only on both ends of each of the fuel cells.

18. The fuel-cell stack according to claim 17, wherein in an electrically parallel direction the electrically conductive member is provided only on said both ends of each of the fuel cells.

* * * * *